US012759115B2

(12) United States Patent
Chen et al.

(10) Patent No.: US 12,759,115 B2
(45) Date of Patent: Oct. 13, 2026

(54) WRENCH WITH ANTI-PENETRATION EFFECT

(71) Applicants: Kung-Cheng Chen, Taichung City (TW); Pei-Yang Lee, Taichung City (TW)

(72) Inventors: Kung-Cheng Chen, Taichung City (TW); Pei-Yang Lee, Taichung City (TW)

( * ) Notice: Subject to any disclaimer, the term of this patent is extended or adjusted under 35 U.S.C. 154(b) by 351 days.

(21) Appl. No.: 18/529,812

(22) Filed: Dec. 5, 2023

(65) Prior Publication Data

US 2024/0189968 A1 Jun. 13, 2024

(30) Foreign Application Priority Data

Dec. 12, 2022 (TW) .................................. 111147668

(51) Int. Cl.
*B25B 13/48* (2006.01)

(52) U.S. Cl.
CPC .................................. *B25B 13/481* (2013.01)

(58) Field of Classification Search
CPC ....... B25B 13/04; B25B 13/08; B25B 13/065; B25B 13/06; B25B 23/0071
See application file for complete search history.

(56) References Cited

U.S. PATENT DOCUMENTS 2,715,347 A * 8/1955 Johnson .................. B25B 13/08 81/124.2
5,307,713 A * 5/1994 White ................... B25B 13/461 81/125
5,983,758 A * 11/1999 Tanner .................... B25B 13/04 81/186
6,186,032 B1 * 2/2001 Raines .................... B25B 13/04 81/186
6,276,241 B1 * 8/2001 Cornog ................... B25B 13/12 81/170
6,955,105 B2 * 10/2005 Chen ....................... B25B 13/12 81/125
7,117,770 B2 * 10/2006 Hsien ...................... B25B 13/46 81/186
7,340,983 B2 * 3/2008 Ling .......................... B21J 5/12 81/186
8,459,153 B2 * 6/2013 Abel ....................... B25B 13/08 81/186

(Continued)

FOREIGN PATENT DOCUMENTS

TW 380467 U 1/2000
TW 201031496 A 9/2010

(Continued)

*Primary Examiner* — Joel D Crandall
(74) *Attorney, Agent, or Firm* — RABIN & BERDO, P.C.

(57) ABSTRACT

A wrench with anti-penetration effect has a body, at least one wrench head, and at least one abutting unit. The at least one wrench head is formed on an end of the body and has at least one engaging portion disposed on an inner side of the at least one wrench head. Each one of the at least one engaging portion has two engaging faces connected to each other with an inclined angle and disposed between a top surface and a bottom surface of the at least one wrench head. The at least one abutting unit is transversally formed on the top surface of the at least one wrench head by punching and extended out of the inner side of the at least one wrench head.

31 Claims, 16 Drawing Sheets

(56) References Cited

U.S. PATENT DOCUMENTS

| | | | | |
|---|---|---|---|---|
| 2005/0011320 A1* | 1/2005 | Hsien | B25B 23/0071 81/180.1 |
| 2011/0167965 A1* | 7/2011 | Fielding | B25B 13/48 81/124.2 |

FOREIGN PATENT DOCUMENTS

| | | | |
|---|---|---|---|
| TW | 201424939 | A | 7/2014 |
| TW | I714436 | B | 12/2020 |

* cited by examiner

WRENCH WITH ANTI-PENETRATION EFFECT

BACKGROUND

1. Field of the Invention

The present invention relates to a wrench, and more particularly to a wrench that may prevent penetration of fasteners, can be rotated at a small angle, and has an anti-penetration effect.

2. Description of Related Art

A conventional wrench is used by a user to lock or loosen fasteners such as bolts or nuts. The conventional wrenches include open-end wrenches, closed-end wrenches, box-end wrenches, combination wrenches, adjustable wrenches, socket wrenches, ratchet wrenches, tubing wrenches, and other types. Among them, the conventional wrench has a clamping face axially formed through a wrench head of the conventional wrench at an inner side of the wrench head and having a contour corresponding to a shape of the fastener. The fastener is rotated by the clamping face abutting against the fastener when the conventional wrench is rotated. However, the conventional wrench can provide an effect of locking or loosening for the fasteners, but the wrench head of the conventional wrench only abuts against an outer surface of the fastener. When the conventional wrench is mounted around the fastener to rotate, the clamping face of the wrench head may be misaligned with the outer surface of the fastener or the wrench head may pass through the fastener during mounting around the fastener, causing the conventional wrench unable to accurately lock or loosen the fastener, and the wrench head needs to be repeatedly aligned with the fastener to rotate the fastener, and the wrench head cannot be firmly positioned on the fastener, which will increase the inconvenience of use.

To resolve the above-mentioned problems, during manufacture of the conventional wrench, a connecting recess is formed in a top surface of the wrench head, and a positioning panel is disposed in the connecting recess. The positioning panel has an inner edge extended out of the clamping face of the wrench head, and this enables a bottom surface of the positioning panel to abut a top surface of the fastener when the conventional wrench is mounted on the fastener to provide a stabilizing effect to the wrench head and avoid the wrench head passing through the fastener. Although the wrench head of the conventional wrench can be stably positioned with the fastener by the positioning panel, it is necessary to process the connecting recess and produce the positioning panel when manufacturing the conventional wrench, and the positioning panel needs to be fixed in the connecting recess after manufacturing to avoid the wrench head passing through the fastener. This will increase the time and cost required for manufacturing, and the structural strength of the positioning panel is easily affected by structural damage or looseness after long-term use, causing the positioning panel to separate from the wrench head, making the conventional wrench unable to stabilize the wrench head and avoid passing through the fastener.

Furthermore, since the contour of the clamping face of the wrench head of the conventional wrench corresponds to the shape of the fastener, when the conventional wrench rotates the fastener, it must be rotated at a certain angle (such as an angle of 60°) before the fastener can be locked or loosened again. Due to the large range of rotation, sufficient space is required for rotation, and multiple times of rotation are required to achieve the effect of locking or loosening the fastener, and this relatively increases the time required to operate the conventional wrench and still needs to be improved.

To overcome the shortcomings, the present invention tends to provide a wrench with anti-penetration effect to mitigate the aforementioned problems.

SUMMARY

The main objective of the invention is to provide a wrench that may prevent penetration of fasteners, can be rotated at a small angle, and has an anti-penetration effect.

A wrench with anti-penetration effect in accordance with the present invention has a body, at least one wrench head, and at least one abutting unit. The at least one wrench head is formed on an end of the body and has at least one engaging portion disposed on an inner side of the at least one wrench head. Each one of the at least one engaging portion has two engaging faces connected to each other with an included angle and disposed between a top surface and a bottom surface of the at least one wrench head. The at least one abutting unit is transversally formed on the top surface of the at least one wrench head by punching and extended out of the inner side of the at least one wrench head.

Other objects, advantages and novel features of the invention will become more apparent from the following detailed description when taken in conjunction with the accompanying drawings.

DETAILED DESCRIPTION OF PREFERRED EMBODIMENTS

Figure 1:
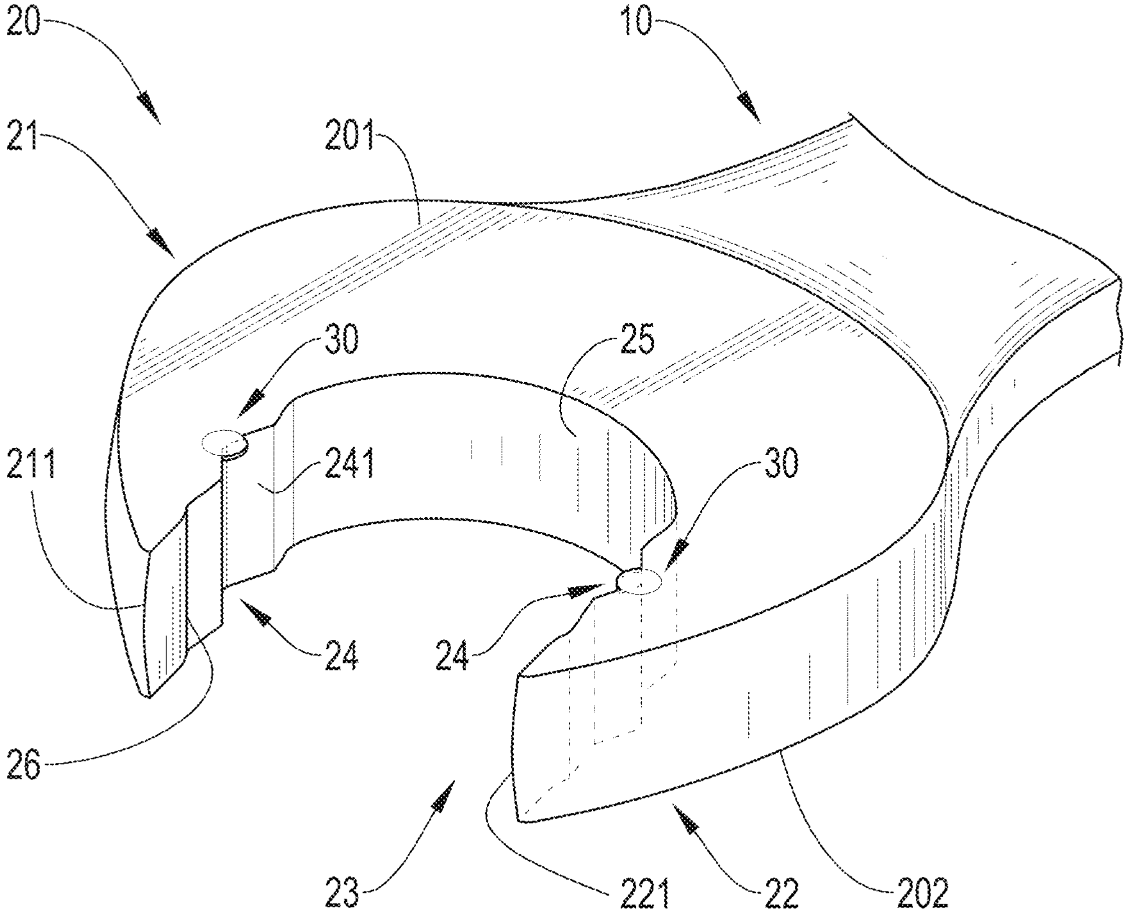
FIG. 1 is a partially enlarged perspective view of a first embodiment of a wrench with anti-penetration effect in accordance with the present invention.
Figure 2:
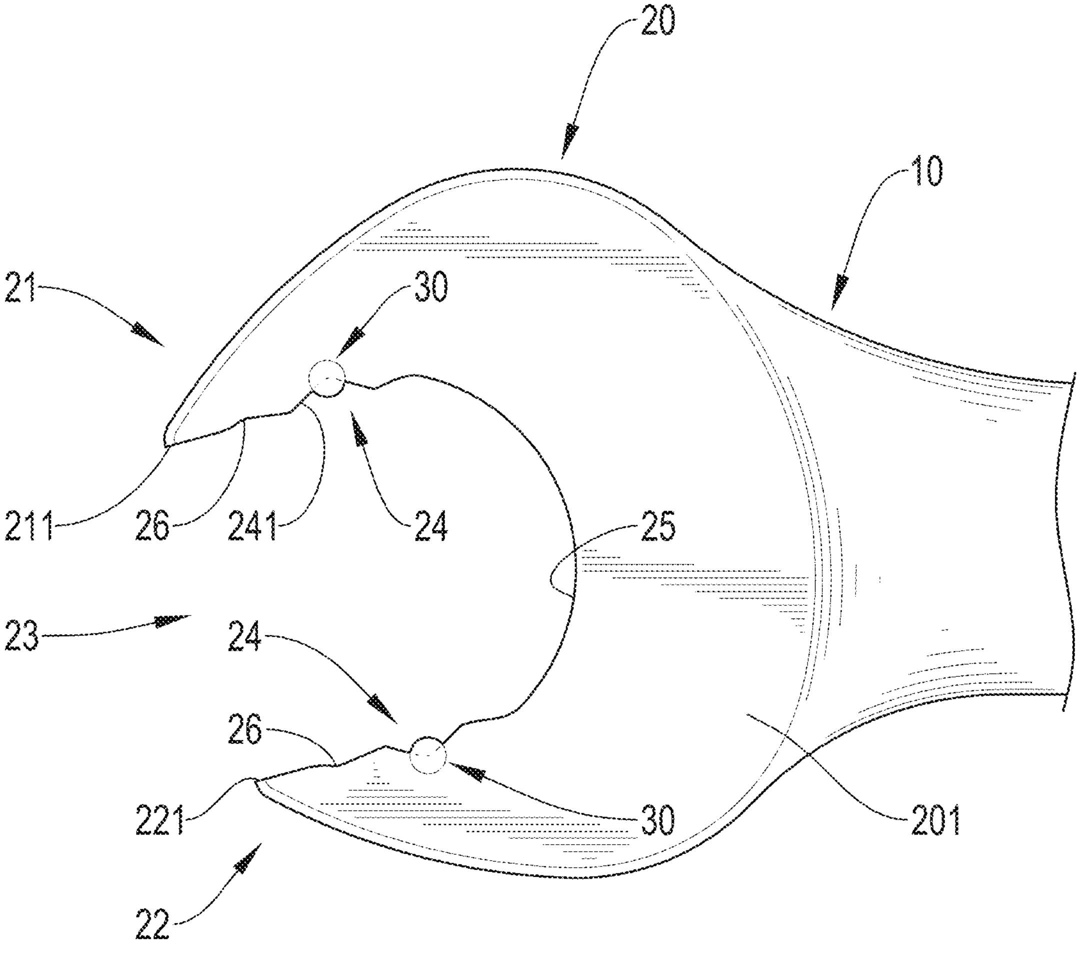
FIG. 2 is a top side view of the wrench with anti-penetration effect in FIG. 1.

With reference to FIGS. 1 and 2, a first embodiment of a wrench with anti-penetration effect in accordance with the present invention comprises a body 10, at least one wrench head 20, and at least one abutting unit 30.

The body 10 may be an elongated panel. The at least one wrench head 20 is formed on an end of the body 10 as a single piece or connected to the end of the body 10 by a connecting component. Preferably, in the present invention, the wrench has two wrench heads 20 respectively disposed on two ends of the body 10, and each one of the two wrench heads 20 is open-ended or closed-ended. In the first embodiment of the present invention, the at least one wrench head 20 is open-ended and has two clamping jaws 21, 22. The two clamping jaws 21, 22 are connected and arranged facing each other, and each one of the two clamping jaws 21, 22 has an end portion 211, 221. The two end portions 211, 221 of the clamping jaws 21, 22 are disposed apart from each other. The at least one wrench head 20 has a mouth 23 formed between the two end portions 211, 221 of the clamping jaws 21, 22. Each one of the two clamping jaws 21, 22 has at least one engaging portion 24 disposed on an inner side of the corresponding clamping jaw 21, 22. Each one of the at least one engaging portion 24 has two engaging faces 241 connected to each other. Each one of the two engaging faces 241 is longitudinally disposed in the inner side of the corresponding clamping jaw 21, 22 between a top surface 20I and a bottom surface 202 of the at least one wrench head 20. Furthermore, the two engaging faces 241 are formed through the top surface 20I and the bottom surface 202 of the at least one wrench head 20, and an inclined angle is formed between the two engaging faces 241. In the first embodiment of the present invention, each clamping jaw 21, 22 has one said engaging portion 24, and the two engaging portions 24 of the two clamping jaws 21, 22 are arranged facing each other. The at least one wrench head 20 has a curved portion 25 (large curved shape) disposed between the two engaging portions 24 of the two clamping jaws 21, 22. In addition, each one of the two clamping jaws 21, 22 has an abutting face 26 disposed on the inner side of the corresponding clamping jaw 21, 22 adjacent to the end portion 211, 221.

The at least one abutting unit 30 is integrally formed on the at least one wrench head 20, is transversally disposed on the top surface 20I of the at least one wrench head 20, and is disposed on the inclined angle of the engaging portion 24 of one of the two clamping jaws 21, 22. The at least one abutting unit 30 transversally extends out of an intersection of the two engaging faces 241 of the corresponding clamping jaw 21, 22. Preferably, the wrench of the present invention has two said abutting units 30 respectively disposed on the engaging portions 24 of the two clamping jaws 21, 22.

Figure 3A:
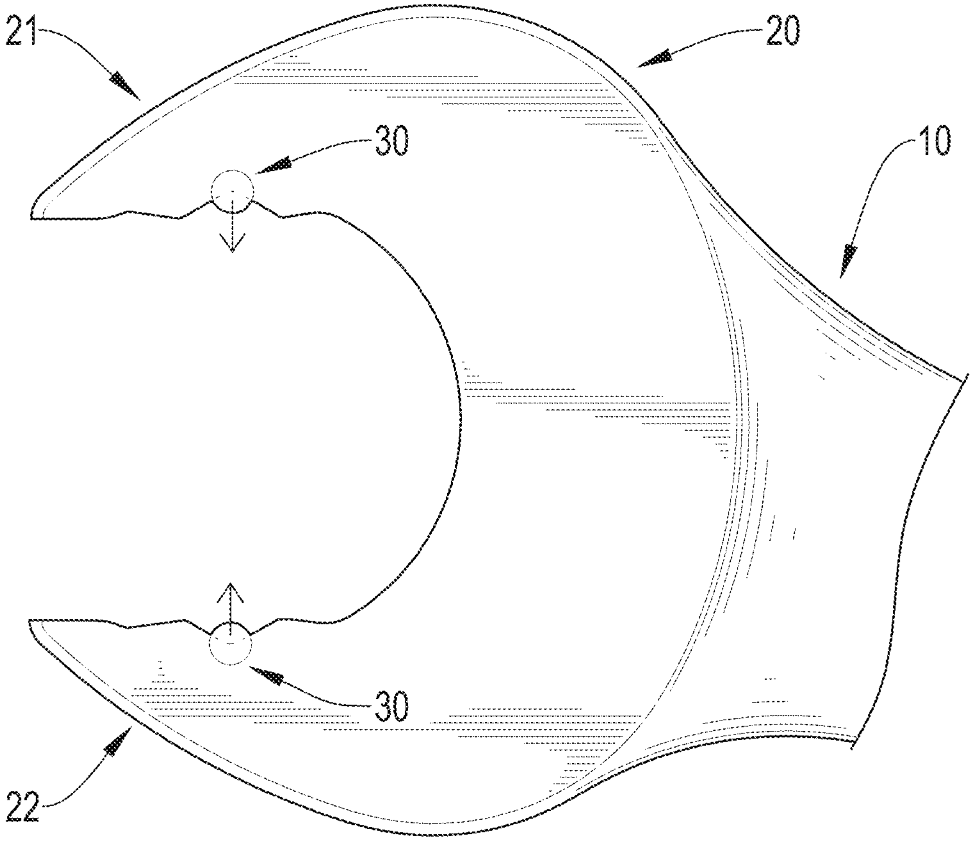
FIG. 3A is a top side view of the wrench with anti-penetration effect in FIG. 1 during a machining process.
Figure 3B:
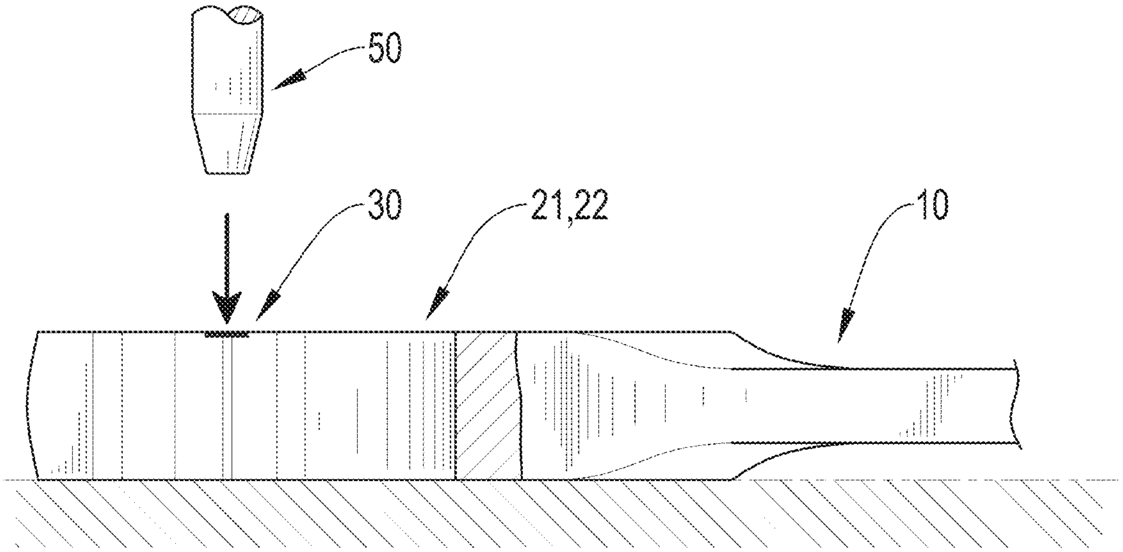
FIG. 3B is a side view in partial section of the wrench with anti-penetration effect in FIG. 1 during the machining process.
Figure 4:
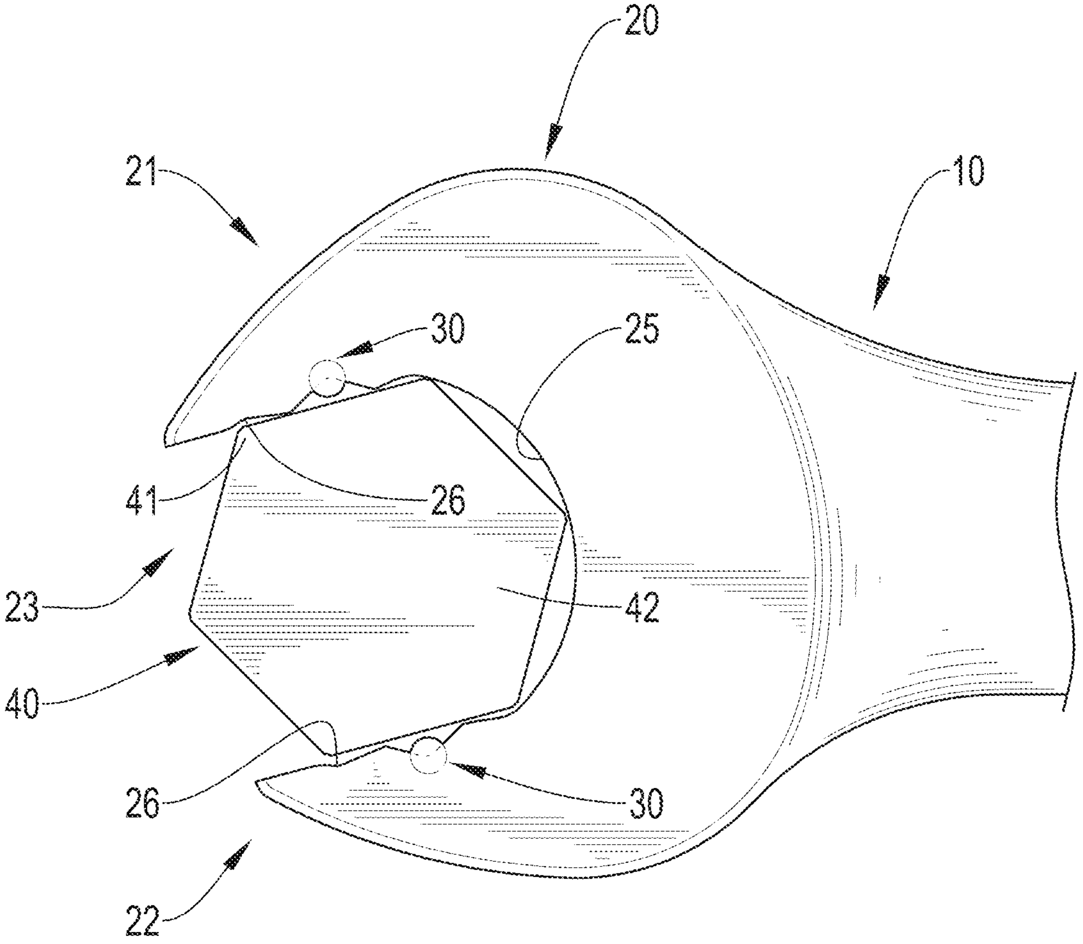
FIG. 4 is an operational top side view of the wrench with anti-penetration effect in FIG. 1, clamping a fastener.
Figure 5:
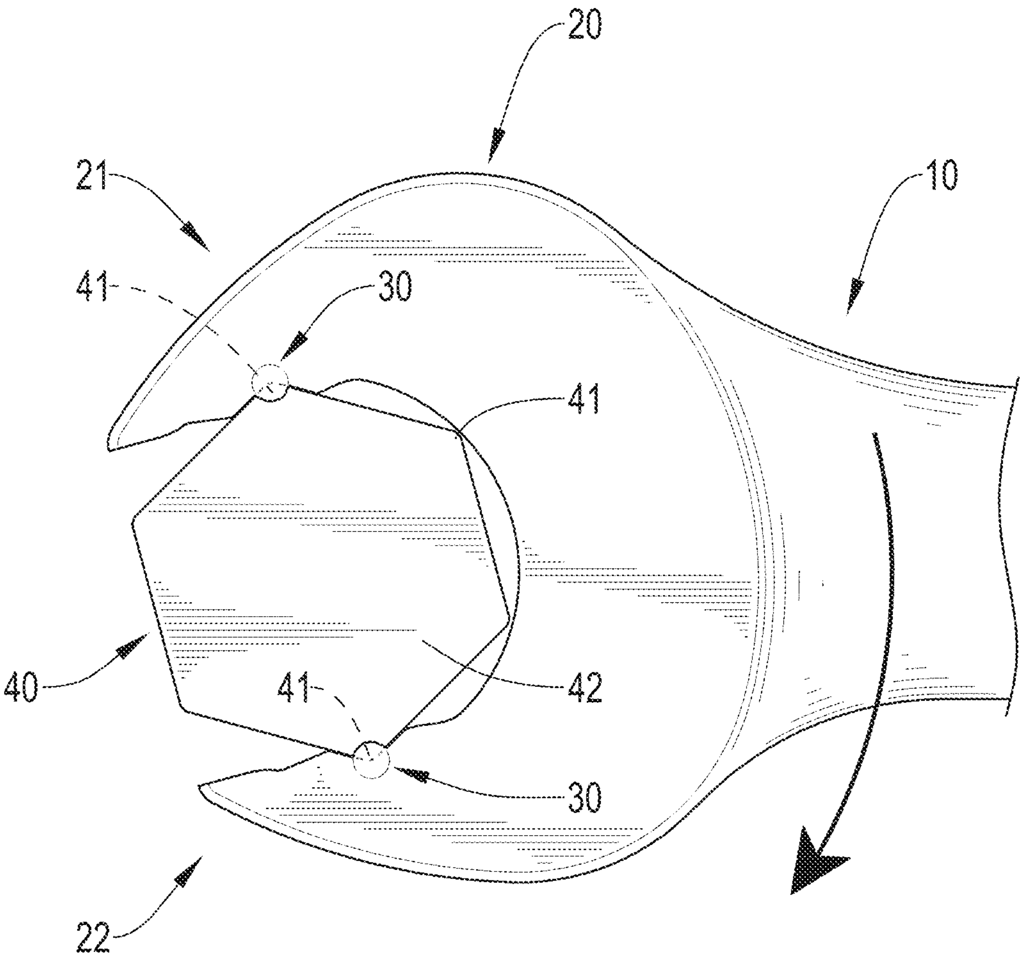
FIG. 5 is an operational top side view of the wrench with anti-penetration effect in FIG. 1, rotating the fastener.

With reference to FIGS. 3A and 3B, in the first embodiment of the present invention, a small punch head 50 aligning with the inclined angle of a corresponding engaging portion 24 is moved toward the wrench head 20 from the top surface 20I to the bottom surface 202 of the wrench head 20 to punch the top surface 20I of the wrench head 20 (riveted external extrusion) deforming to form the said abutting unit 30 at the inclined angle of the corresponding engaging portion 24. With reference to FIG. 4, when the first embodiment of the present invention is in use, a fastener 40 is disposed between the two clamping jaws 21, 22 via the mouth 23, and each one of the two abutting faces 26 of the two clamping jaws 21, 22 abuts one of sides of the fastener 40 to prevent the fastener 40 separating from the two clamping jaws 21, 22 via the mouth 23 when the at least one wrench head 20 is rotated. Furthermore, with reference to FIG. 5, when the at least one wrench head 20 is rotated relative to the fastener 40, one of the corners 41 of the fastener 40 moves into the engaging portion 24 of one of the two clamping jaws 21, 22, the two engaging faces 241 of the corresponding engaging portion 24 respectively abut two sides of the corresponding corner 41, and a top side 42 of the fastener 40 abuts the at least one abutting unit 30. Then the at least one wrench head 20 can be stably connected with the fastener 40 to prevent the at least one wrench head 20 from penetrating the fastener 40. That is, the corresponding corner 41 of the fastener 40 is abutted and engaged by the two engaging faces 241 of the corresponding engaging portion 24 and the at least one abutting unit 30 at the same time, and this enables the wrench of the first embodiment of the present invention to lock or loosen the fastener 40 stably without penetration.

Figure 6A:
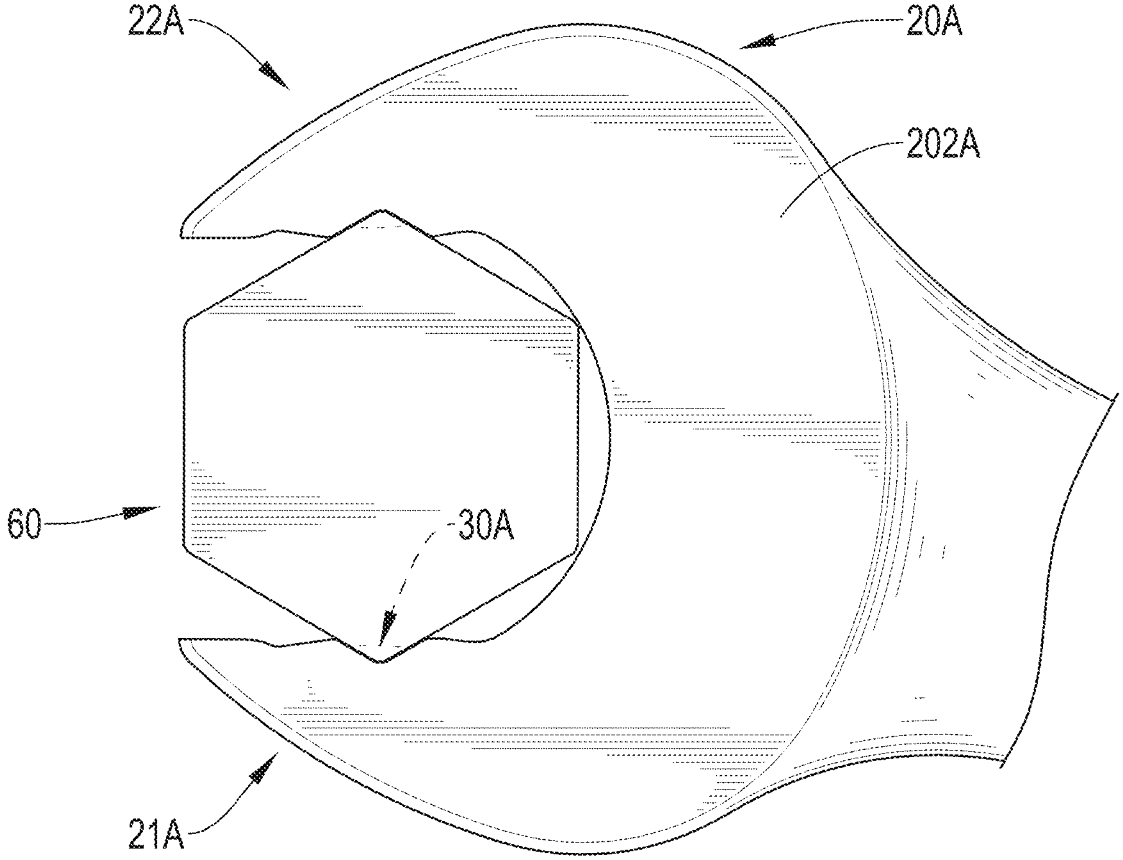
FIG. 6A is a bottom side view of a second embodiment of a wrench with anti-penetration effect in accordance with the present invention during a machining process.
Figure 6B:
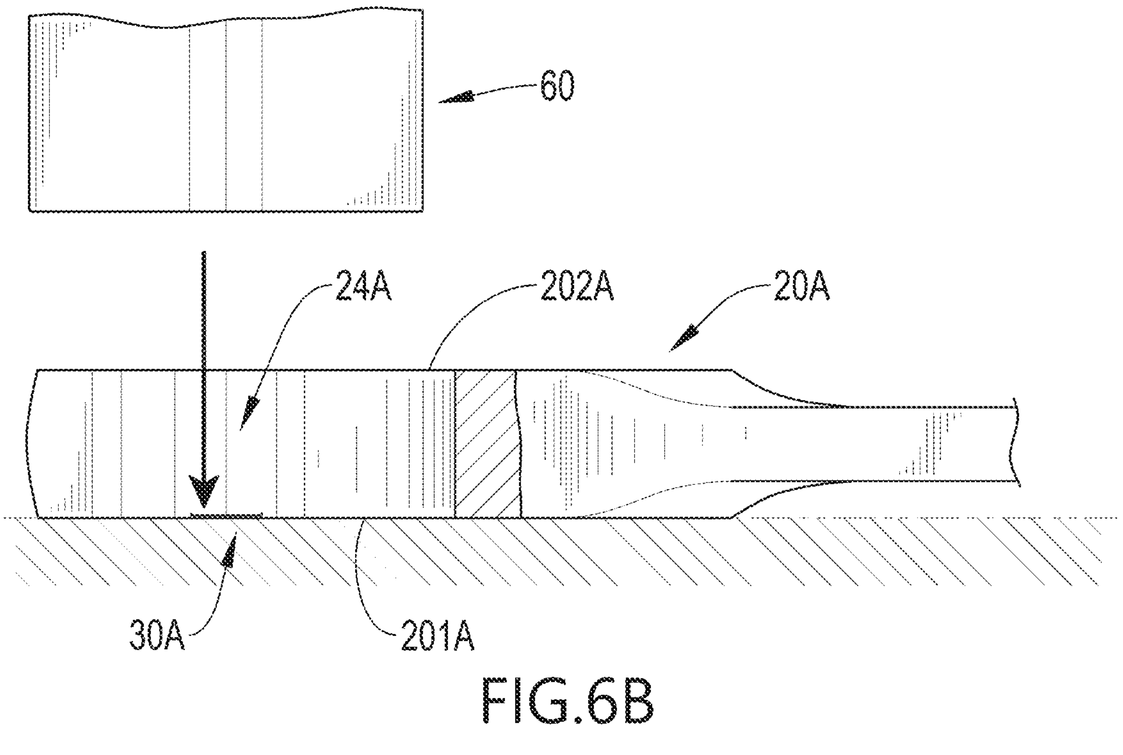
FIG. 6B is a side view in partial section of the wrench with anti-penetration effect in FIG. 6A during the machining process.

With reference to FIGS. 6A and 6B, a second embodiment of a wrench with anti-penetration effect in accordance with the present invention is substantially the same as the first embodiment except for the following features. In the second embodiment of the present invention, a large punch head 60 aligning with the inclined angles of the engaging portions 24A of the two clamping jaws 21A, 22A is moved toward the wrench head 20A from the bottom surface 202A to the top surface 201A of the wrench head 20A to punch the top surface 201A of the wrench head 20A (cold-pressed internal extrusion) deforming to form the said abutting units 30A at the inclined angles of the two clamping jaws 21A, 22A.

Figure 7A:
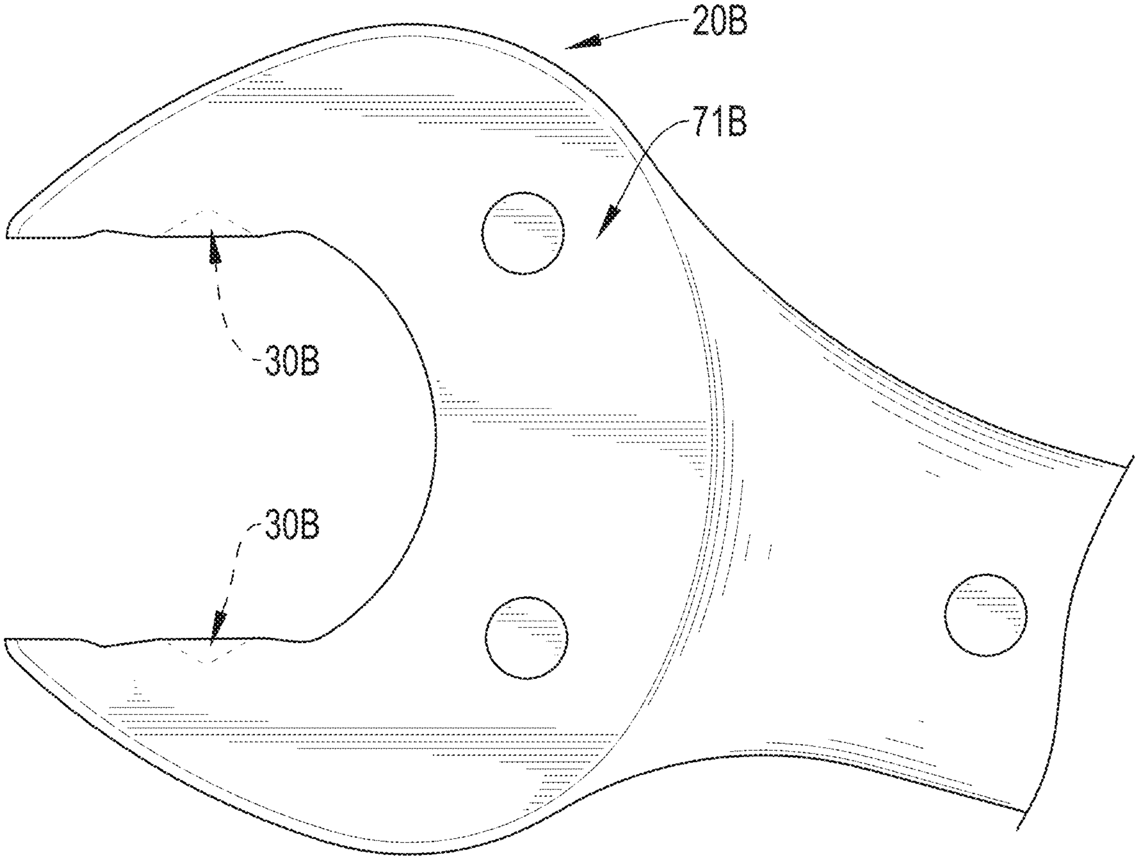
FIG. 7A is a top side view of a third embodiment of a wrench with anti-penetration effect in accordance with the present invention during a machining process.
Figure 7B:
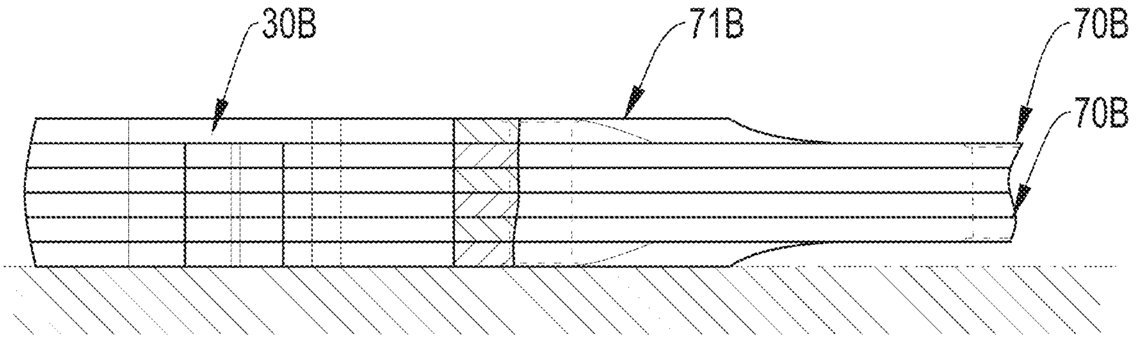
FIG. 7B is a side view in partial section of the wrench with anti-penetration effect in FIG. 7A during the machining process.
Figure 8:
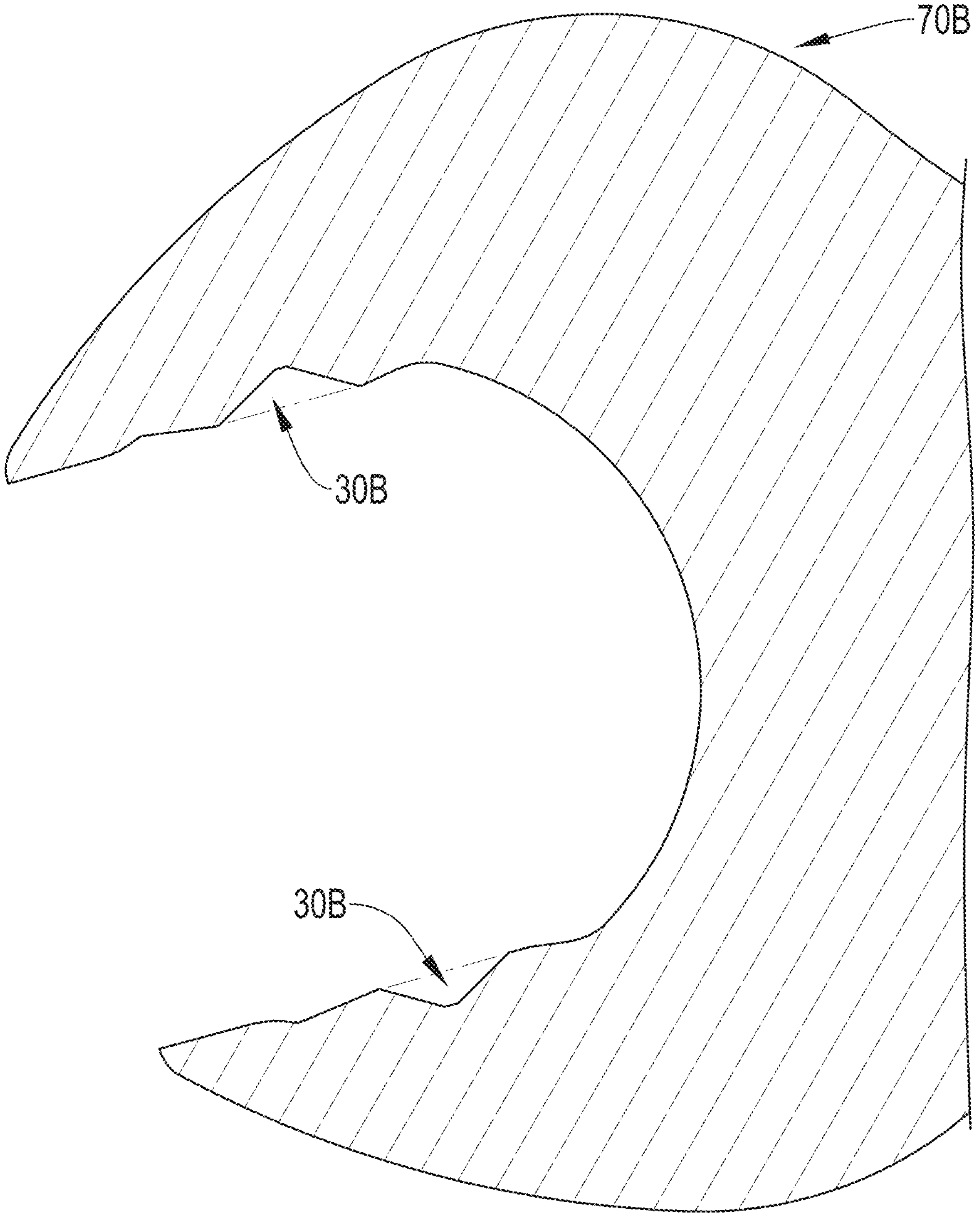
FIG. 8 is an enlarged cross sectional top side view of the wrench with anti-penetration effect in FIG. 7A.

With reference to FIGS. 7A, 7B, and 8, a third embodiment of a wrench with anti-penetration effect in accordance with the present invention is substantially the same as the first embodiment except for the following features. In the third embodiment of the present invention, the wrench is formed by multiple stacking and riveting pieces 70B, 71B. The uppermost piece 71B has a shape different from those of the other pieces 70B in the inner side that forms the at least one wrench head 20B. The uppermost piece 71B forms the abutting units 30B different from the other pieces 70B. Furthermore, the abutting units 30B of the uppermost piece 71B can also be formed by stamping.

Figure 9:
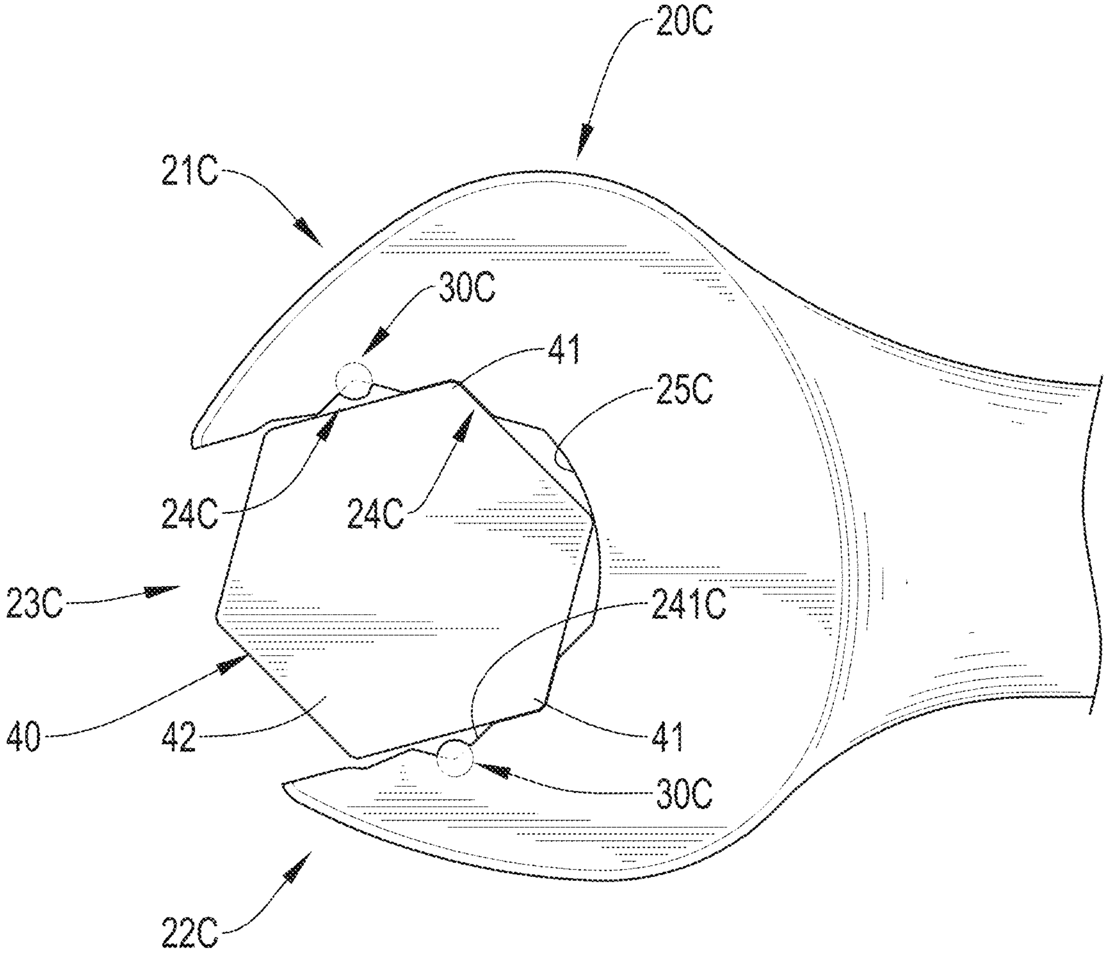
FIG. 9 is an operational top side view of a fourth embodiment of a wrench with anti-penetration effect in accordance with the present invention, clamping a fastener.

With reference to FIG. 9, a fourth embodiment of a wrench with anti-penetration effect in accordance with the present invention is substantially the same as the first embodiment except for the following features. In the fourth embodiment of the present invention, each one of the two clamping jaws 21C, 22C has two engaging portions 24C disposed on the inner side of the clamping jaw 21C, 22C at a spaced interval, and the wrench has two abutting units 30C. Each one of the two abutting units 30C is disposed on one of the two engaging portions 24C of one of the two clamping jaws 21C, 22C adjacent to the mouth 23C. When the fastener 40 is mounted in the at least one wrench head 20C before rotating, two of the corners 41 of the fastener 40 adjacent to the curved portion 25C (middle curved shape) are respectively disposed in two of the engaging portions 24C of the two clamping jaws 21C, 22C that are away from the two abutting units 30C. When the at least one wrench head 20C is rotated relative to the fastener 40, two of the corners 41 of the fastener 40 are respectively moved into two of the engaging portions 24C of the two clamping jaws 21C, 22C that form the two abutting units 30C. Then the two engaging faces 241C of each one of the two corresponding engaging portions 24C respectively abut two sides of one of the two corresponding corners 41 of the fastener 40, the abutting unit 30C at the corresponding engaging portion 24C abuts the top side 42 of the fastener 40 at the same time, and this enables the at least one wrench head 20C to stably connect to the fastener 40 and prevents the at least one wrench head 20C passing through the fastener 40.

Figure 10:
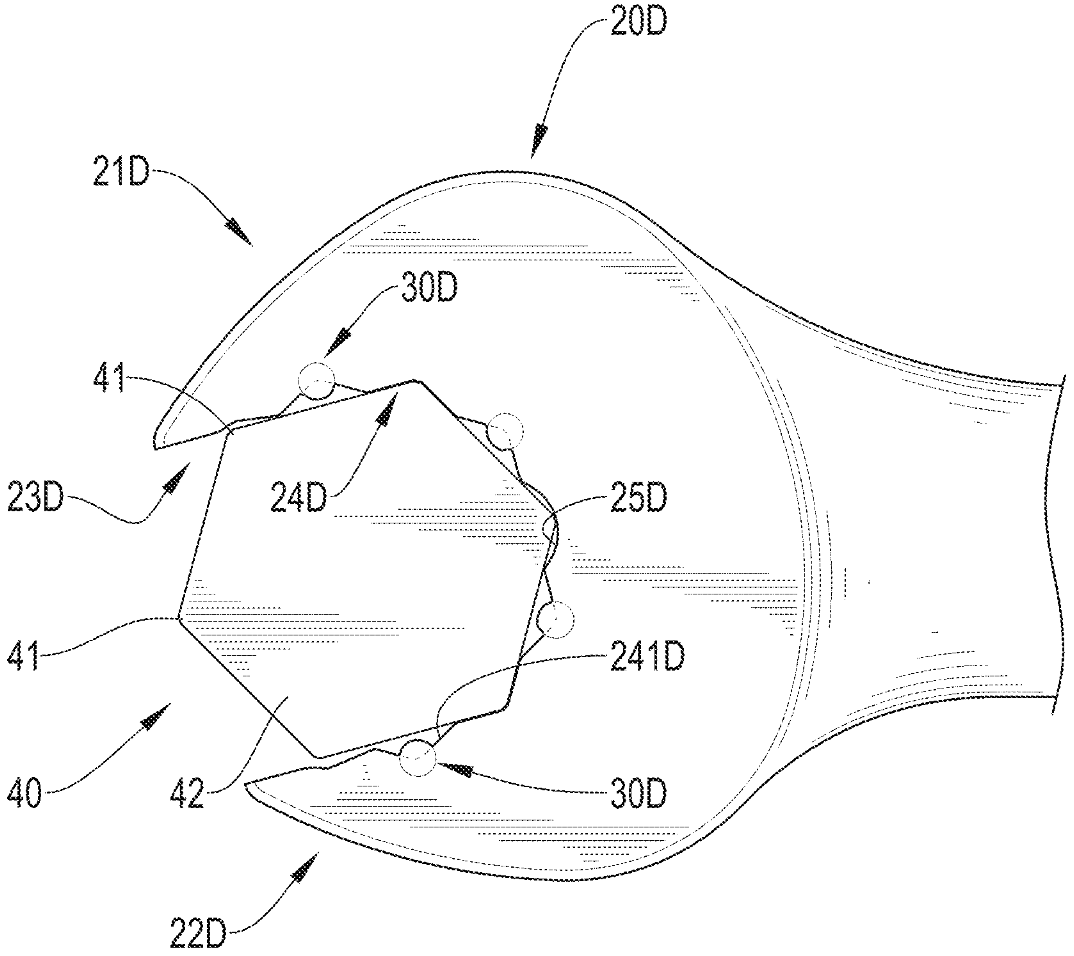
FIG. 10 is an operational top side view of a fifth embodiment of a wrench with anti-penetration effect in accordance with the present invention, clamping a fastener.

With reference to FIG. 10, a fifth embodiment of a wrench with anti-penetration effect in accordance with the present invention is substantially the same as the first embodiment except for the following features. In the fifth embodiment of the present invention, each one of the two clamping jaws 21D, 22D has three engaging portions 24D disposed on the inner side of the clamping jaw 21D, 22D at spaced intervals, and the wrench has four abutting units 30D. Two of the abutting units 30D are disposed on one of the two clamping jaws 21D, 22D, and the other two of the abutting units 30D are disposed on the other one of the two clamping jaws 21D, 22D. The two abutting units 30D on each one of the two clamping jaws 21D, 22D are respectively disposed on two of the three engaging portions 24D of the corresponding clamping jaw 21D, 22D. One of the two abutting units 30D on the clamping jaw 21D, 22D is disposed on the engaging portion 24D that is adjacent to the mouth 23D, and the other one of the two abutting units 30 is disposed on the engaging portion 24D that is adjacent to the curved portion 25D. When the fastener 40 is mounted in the at least one wrench head 20D before rotating, two of the corners 41 of the fastener 40 adjacent to the curved portion 25D (small curved shape) are respectively disposed in two of the engaging portions 24D of the two clamping jaws 21D, 22D without disposing the abutting units 30D. When the at least one wrench head 20D is rotated relative to the fastener 40, four of the corners 41 of the fastener 40 are respectively moved into four of the engaging portions 24D of the two clamping jaws 21D, 22D that form the four abutting units 30D. Then the two engaging faces 241D of each one of the four corresponding engaging portions 24D respectively abut two sides of one of the four corresponding corners 41 of the fastener 40, the abutting unit 30D at the corresponding engaging portion 24D abuts the top side 42 of the fastener 40 at the same time, and this enables the at least one wrench head 20D to stably connect to the fastener 40 and prevents the at least one wrench head 20D passing through the fastener 40.

Figure 11:
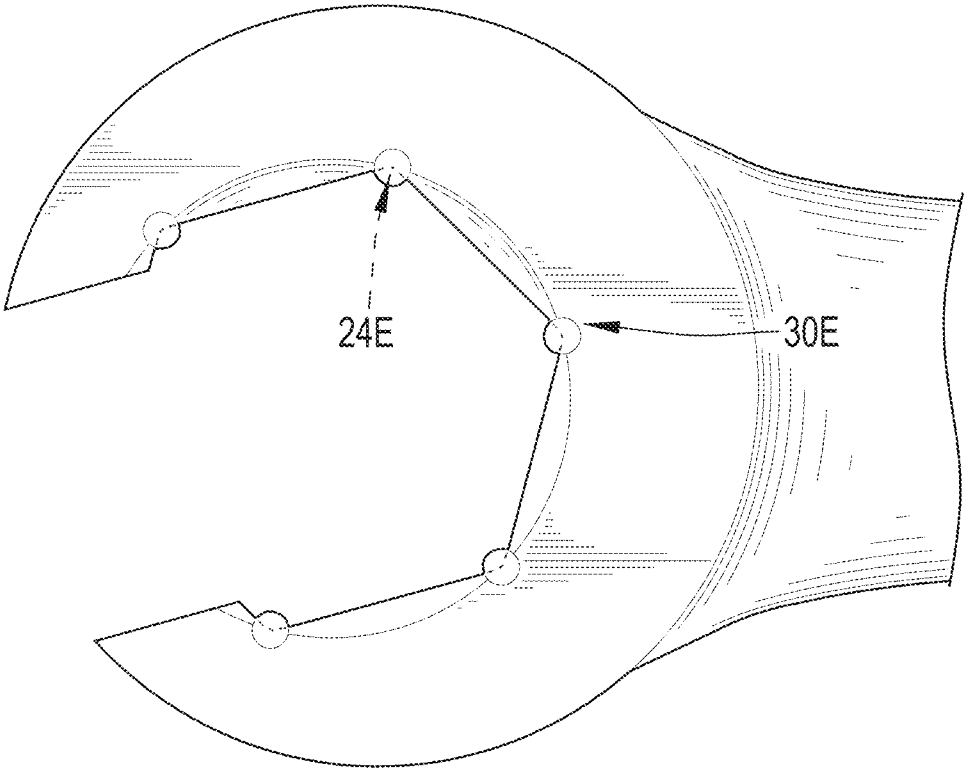
FIG. 11 is a partially enlarged top side view of a sixth embodiment of a wrench with anti-penetration effect in accordance with the present invention.

With reference to FIG. 11, a sixth embodiment of a wrench with anti-penetration effect in accordance with the present invention is substantially the same as the first embodiment except for the following features. In the sixth embodiment of the present invention, the wrench is a tubing wrench and has one said abutting unit 30E disposed on each engaging portion 24E.

Figure 12:
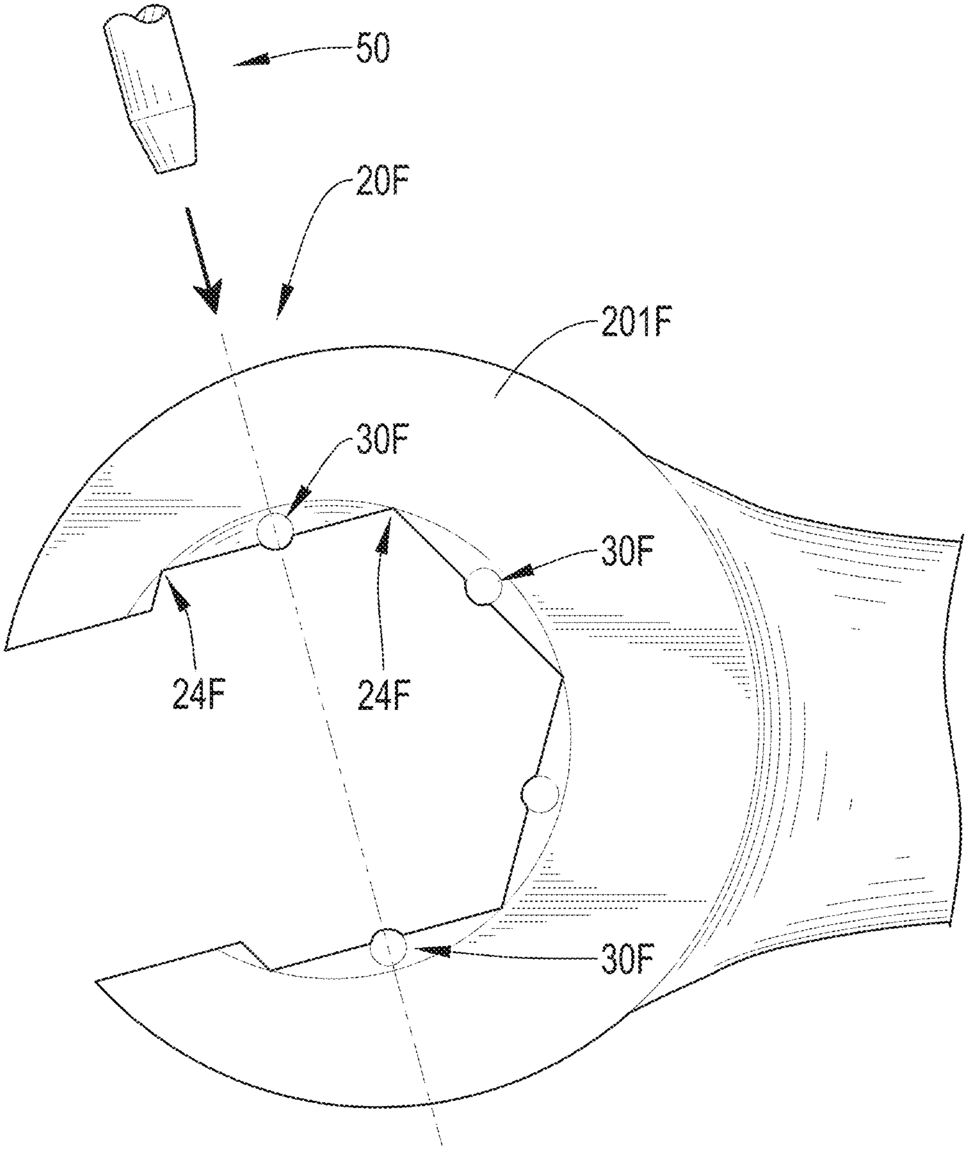
FIG. 12 is a top side view of a seventh embodiment of a wrench with anti-penetration effect in accordance with the present invention during a machining process.

With reference to FIG. 12, a seventh embodiment of a wrench with anti-penetration effect in accordance with the present invention is substantially the same as the sixth embodiment except for the following features. In the seventh embodiment of the present invention, each abutting unit 30F is formed on the top surface 201F between two adjacent engaging portions 24F. That is, the small punch head 50 is moved toward the wrench head 20F from the top surface 201F to the bottom surface of the wrench head 20F to punch the top surface 201F of the wrench head 20F (riveted external extrusion) deforming to form the said abutting unit 30F at the top surface 201F.

Figure 13:
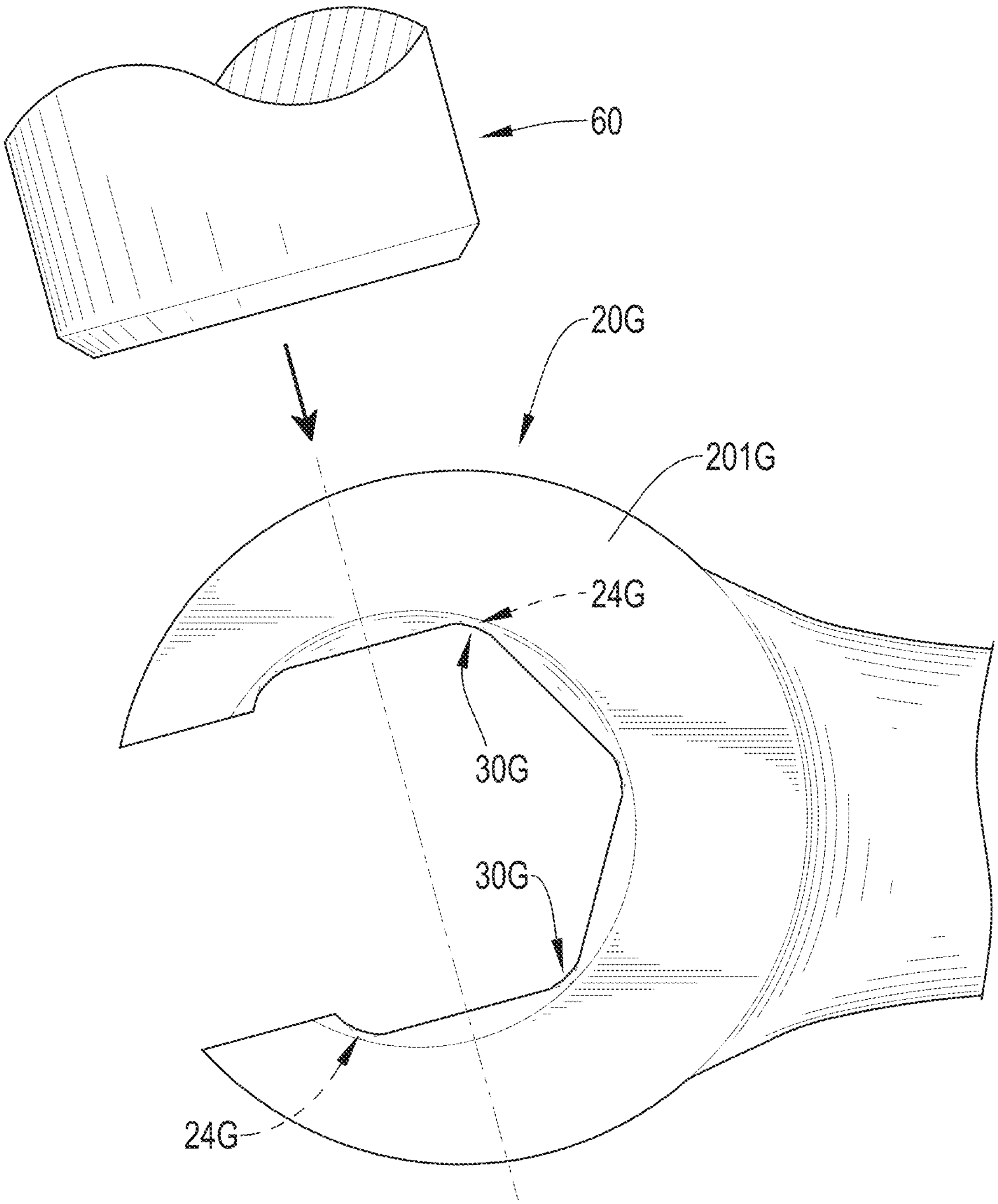
FIG. 13 is a top side view of an eighth embodiment of a wrench with anti-penetration effect in accordance with the present invention during a machining process.

With reference to FIG. 13, an eighth embodiment of a wrench with anti-penetration effect in accordance with the present invention is substantially the same as the sixth embodiment except for the following features. In the eighth embodiment of the present invention, the said abutting units 30G are formed on the top surface 201G of the wrench head 20G respectively at the engaging portions 24G. That is, the large punch head 60 is moved toward the wrench head 20G from the top surface 201G to the bottom surface of the wrench head 20G to punch the top surface 201G of the wrench head 20G (riveted external extrusion) deforming to form the said abutting units 30G on the top surface 201G.

Figure 14A:
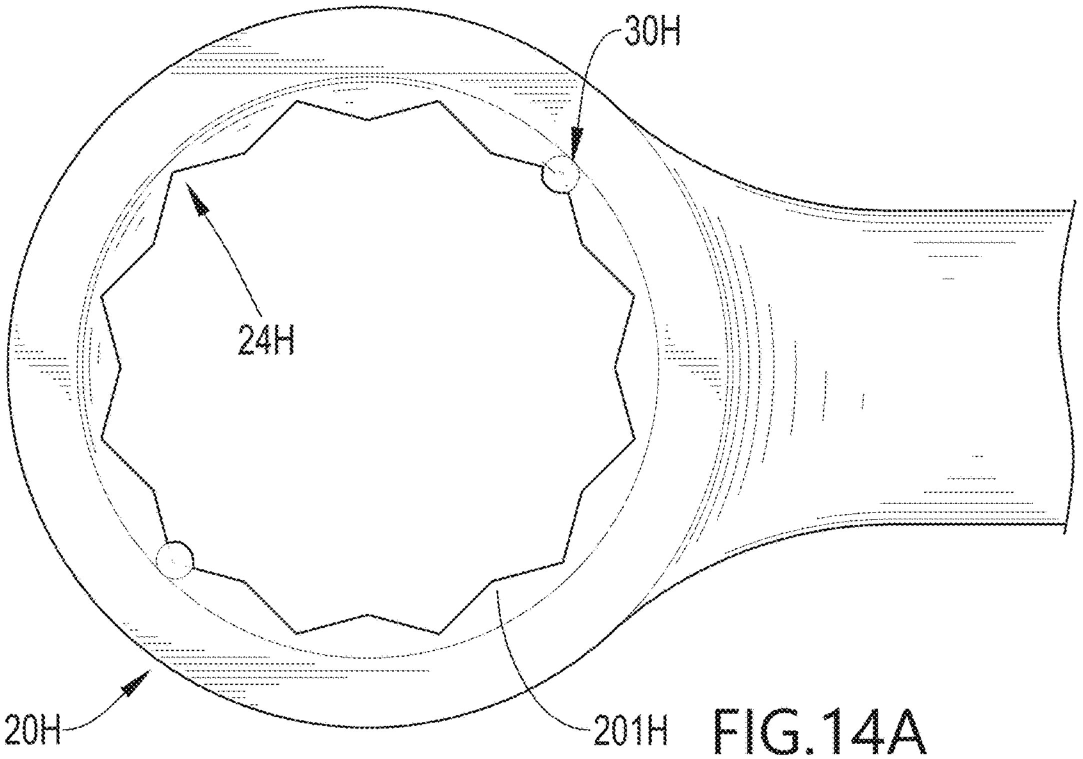
FIG. 14A is a top side view of a ninth embodiment of a wrench with anti-penetration effect in accordance with the present invention during a machining process.
Figure 14B:
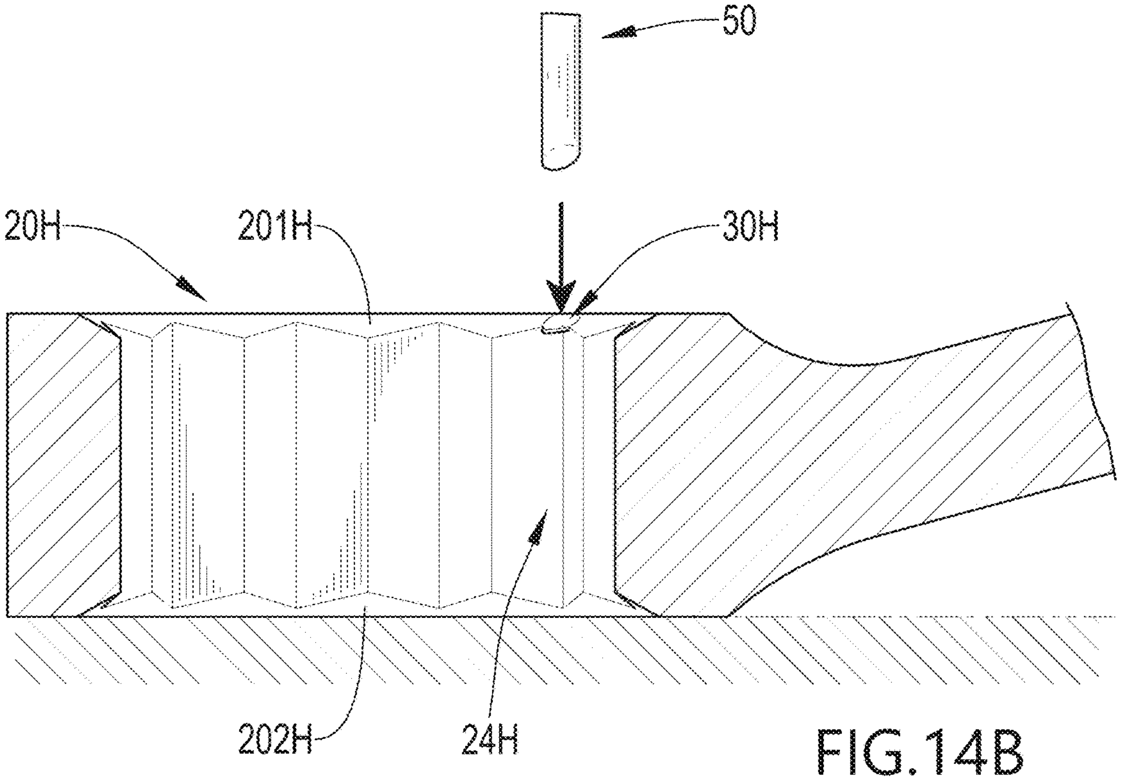
FIG. 14B is a side view in partial section of the wrench with anti-penetration effect in FIG. 14A during the machining process.

With reference to FIGS. 14A and 14B, a ninth embodiment of a wrench with anti-penetration effect in accordance with the present invention is substantially the same as the first embodiment except for the following features. In the ninth embodiment of the present invention, the wrench is a closed-end wrench and the at least one wrench head 20H has multiple engaging portions 24H formed in the inner side of the wrench head 20H at spaced intervals. The at least one wrench head 20H has said abutting unit 30H formed on the top surface 201H and aligning with at least one of the engaging portions 24H. That is, the small punch head 50 aligning with the corresponding engaging portion 24 is moved toward the wrench head 20H from the top surface 201H to the bottom surface 202H of the wrench head 20H to punch the top surface 201H of the wrench head 20 (riveted external extrusion) deforming to form the said abutting unit 30 on the top surface 201H as a single piece. Preferably, the wrench has six or twelve engaging portions 24H formed on the inner side of the at least one wrench head 20H.

Figure 15A:
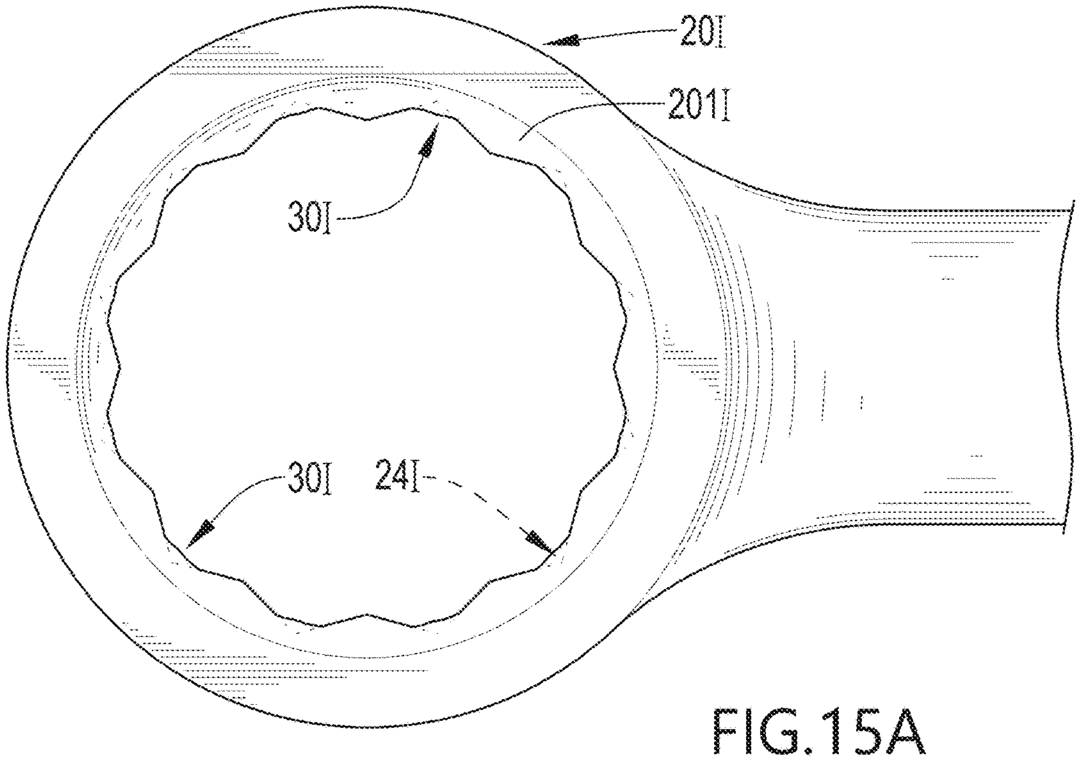
FIG. 15A is a top side view of a tenth embodiment of a wrench with anti-penetration effect in accordance with the present invention during a machining process.
Figure 15B:
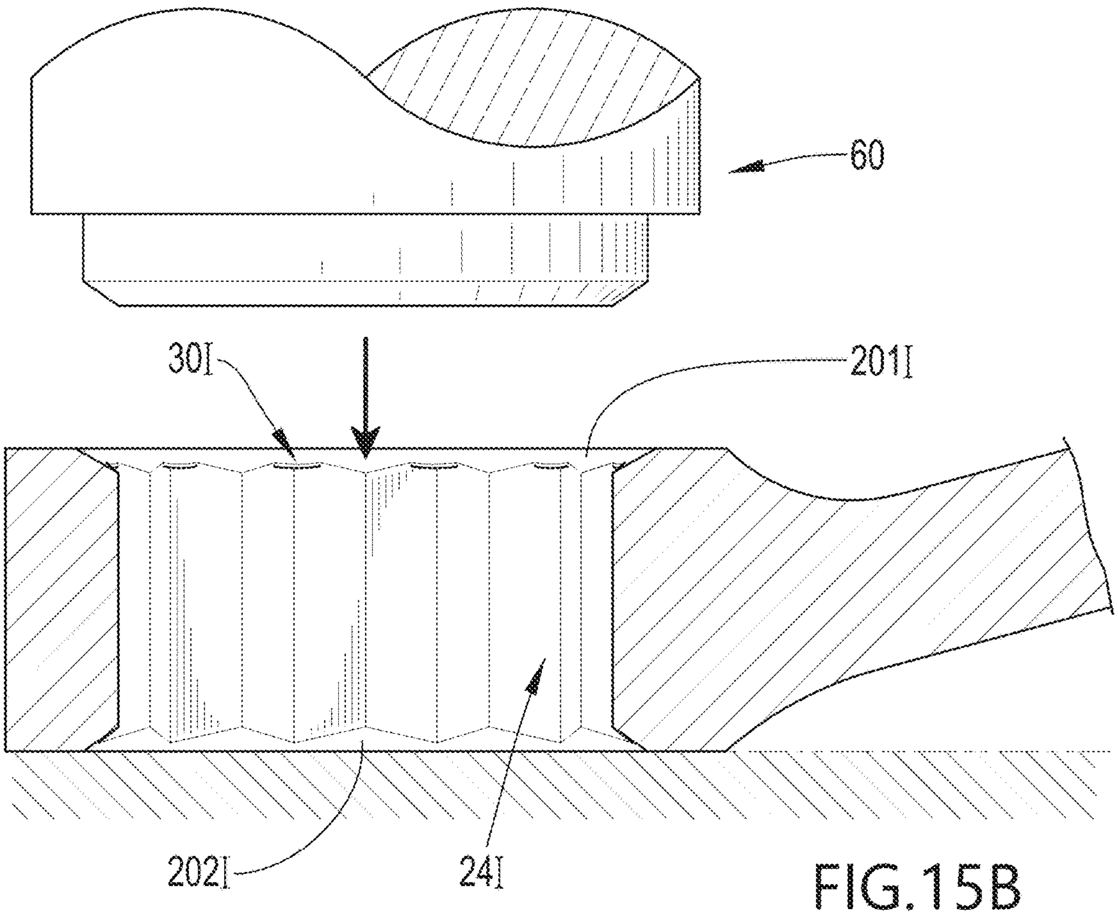
FIG. 15B is a side view in partial section of the wrench with anti-penetration effect in FIG. 15A during the machining process.

With reference to FIGS. 15A and 15B, a tenth embodiment of a wrench with anti-penetration effect in accordance with the present invention is substantially the same as the ninth embodiment except for the following features. In the tenth embodiment of the present invention, the said abutting units 30I are respectively formed at the engaging portions 24I. That is, the large punch head 60 is moved toward the wrench head 20I from the top surface 201I to the bottom surface 202I of the wrench head 20I to punch the top surface 201I (riveted external extrusion) deforming to form the said abutting units 30 respectively at the engaging portions 24I on the top surface 201I of the wrench head 20I as a single piece.

Figure 16A:
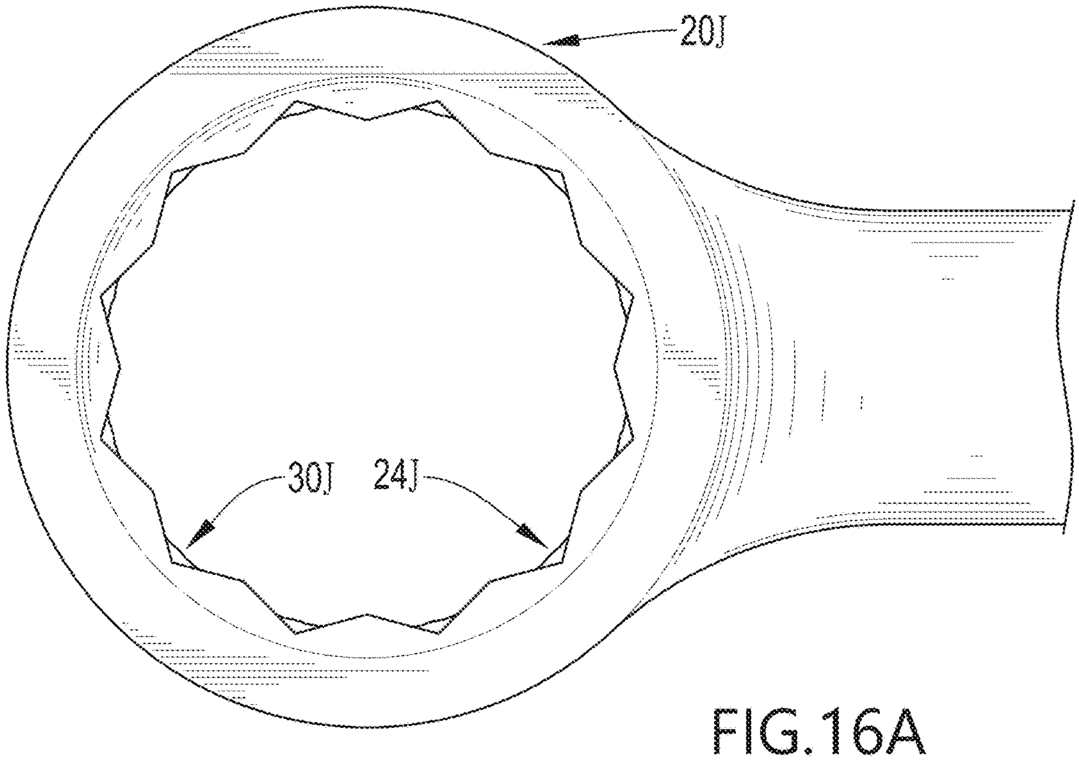
FIG. 16A is a bottom side view of an eleventh embodiment of a wrench with anti-penetration effect in accordance with the present invention during a machining process.
Figure 16B:
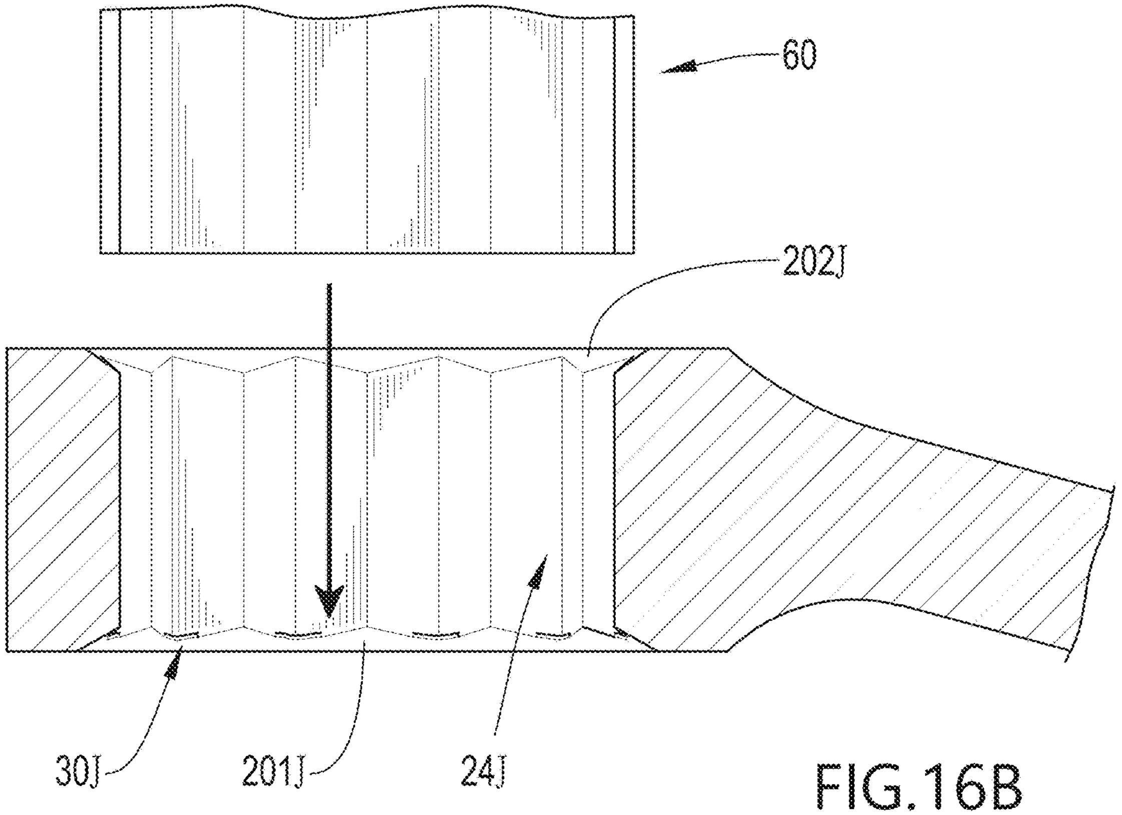
FIG. 16B is a side view in partial section of the wrench with anti-penetration effect in FIG. 16A during the machining process.

With reference to FIGS. 16A and 16B, an eleventh embodiment of a wrench with anti-penetration effect in accordance with the present invention is substantially the same as the tenth embodiment except for the following features. In the eleventh embodiment of the present invention, the said abutting units 30J are respectively formed at the engaging portions 24J. That is, the large punch head 60 aligning with the inclined angles of the engaging portions 24J is moved toward the wrench head 20J from the bottom surface 202J to the top surface 201J of the wrench head 20J to punch the top surface 201J of the wrench head 20J (cold-pressed internal extrusion) deforming to form the said abutting units 30J at the inclined angles of the engaging portions 24J as a single piece.

According to the above-mentioned structural relationship and features of a wrench with anti-penetration effect in accordance with the present invention, the wrench as described has the following advantages.

First, anti-penetration effect: in use, the at least one abutting unit 30, 30A, 30B, 30C, 30D, 30E, 30F, 30G, 30H, 30I, 30J is formed on the top surface 201, 201A, 201F, 201G, 201H, 201I, 201J and extended out of the inner side of the at least one wrench head 20, 20A, 20B, 20C, 20D, 20F, 20G, 20H, 20I, 20J to abut the top side 42 of the fastener 40, and this can prevent the at least one wrench head 20, 20A, 20B, 20C, 20D, 20F, 20G, 20H, 20I, 20J from passing through the fastener 40. Then the at least one wrench head 20, 20A, 20B, 20C, 20D, 20F, 20G, 20H, 20I, 20J of the wrench of the present invention can stably connect to the fastener 40 to lock or loosen the fastener 40 during rotating the fastener 40, and this is convenient in use.

Second, simplified structure: the said abutting unit 30, 30A, 30B, 30C, 30D, 30E, 30F, 30G, 30H, 30I, 30J is formed on the at least one wrench head 20, 20A, 20B, 20C, 20D, 20F, 20G, 20H, 20I, 20J by the small punch head 50 or the large punch head 60 punching (riveted external extrusion/cold-pressed internal extrusion) the at least one wrench head 20, 20A, 20B, 20C, 20D, 20F, 20G, 20H, 20I, 20J without forming a connecting recess and producing a positioning panel of the at least one wrench head 20, 20A, 20B, 20C, 20D, 20F, 20G, 20H, 20I, 20J. The at least one abutting unit 30, 30A, 30B, 30C, 30D, 30E, 30F, 30G, 30H, 30I, 30J is integrally formed on the wrench head 20, 20A, 20B, 20C, 20D, 20F, 20G, 20H, 20I, 20J to improve the structural strength of the at least one abutting unit 30, 30A, 30B, 30C, 30D, 30E, 30F, 30G, 30H, 30I, 30J, reduce the requirement of time and cost for processing the connecting recess and producing and assembling the positioning panel, and effectively prevent the impact on the anti-penetration effect caused by separation of the positioning panel and the connecting recess after long-term use.

Third, small-angle rotation: multiple engaging portions 24, 24A, 24C, 24D, 24E, 24F, 24D, 24H, 24I, 24J are disposed in the inner side of the at least one wrench head 20, 20A, 20B, 20C, 20D, 20F, 20G, 20H, 20I, 20J, and this enables a user to rotate the wrench at a small angle (such as an angle of 30°) to lock or loosen the fastener 40 to significantly shorten the space and times required for rotation and relatively reduce the time required for operation.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A wrench with anti-penetration effect comprising:

a body being an elongated panel;

at least one wrench head formed on an end of the body, and each one of the at least one wrench head having an inner side;

a top surface;

a bottom surface;

at least two engaging portions disposed on the inner side of the at least one wrench head, and each one of the at least two engaging portions having two engaging faces connected to each other with an inclined angle and disposed between the top surface and the bottom surface of the at least one wrench head; and a curved portion formed in the inner side of the at least one wrench head between the at least two engaging portions of the at least one wrench head; and at least one abutting unit transversally and integrally formed on the top surface of the at least one wrench head by punching and extended out of the inner side of the at least one wrench head.

2. The wrench with anti-penetration effect as claimed in claim 1, wherein the at least one wrench head is open-ended and has two clamping jaws connected and arranged facing each other, each one of the two clamping jaws having an end portion, and the two end portions disposed apart from each other; and a mouth formed between the two end portions of the two clamping jaws;

at least one of the at least two engaging portions is formed on an inner side of each one of the two clamping jaws; and the wrench has one said abutting unit disposed on the said engaging portion of each one of the two clamping jaws, aligning with the inclined angle of the said engaging portion, and transversally extended out of the two engaging faces of the said engaging portion.

3. The wrench with anti-penetration effect as claimed in claim 2, wherein each one of the two clamping jaws has one said engaging portion, and the two said engaging portions of the two clamping portions face to each other.

4. The wrench with anti-penetration effect as claimed in claim 3, wherein each one of the two clamping jaws has an abutting face disposed on the inner side of the clamping jaw adjacent to the end portion of the clamping jaw to abut one of sides of a fastener to prevent the fastener separating from the two clamping jaws via the mouth when the at least one wrench head is rotated.

5. The wrench with anti-penetration effect as claimed in claim 4, wherein the said abutting unit is formed on the top surface of the at least one wrench head at the inclined angle of a corresponding said engaging portion by a small punch head moved toward the at least one wrench head from the top surface to the bottom surface of the at least one wrench head to punch the top surface of the at least one wrench head deforming to form the said abutting unit.

6. The wrench with anti-penetration effect as claimed in claim 4, wherein the said abutting units are formed on the top surface of the at least one wrench head respectively at the inclined angles of two corresponding said engaging portions by a large punch head moved toward the at least one wrench head from the bottom surface to the top surface of the at least one wrench head to punch the top surface of the at least one wrench head deforming to form the said abutting units on the clamping jaws.

7. The wrench with anti-penetration effect as claimed in claim 4, wherein the wrench is a tubing wrench and has one said abutting unit disposed on each engaging portion.

8. The wrench with anti-penetration effect as claimed in claim 7, wherein the said abutting units are formed on the top surface of the at least one wrench head respectively at the said engaging portions by a large punch head moved toward the at least one wrench head from the top surface to the bottom surface of the at least one wrench head to punch the top surface of the at least one wrench head deforming to form the said abutting units on the top surface of the at least one wrench head.

9. The wrench with anti-penetration effect as claimed in claim 3, wherein the said abutting unit is formed on the top surface of the at least one wrench head at the inclined angle of a corresponding said engaging portion by a small punch head moved toward the at least one wrench head from the top surface to the bottom surface of the at least one wrench head to punch the top surface of the at least one wrench head deforming to form the said abutting unit.

10. The wrench with anti-penetration effect as claimed in claim 3, wherein the said abutting units are formed on the top surface of the at least one wrench head respectively at the inclined angles of two corresponding said engaging portions by a large punch head moved toward the at least one wrench head from the bottom surface to the top surface of the at least one wrench head to punch the top surface of the at least one wrench head deforming to form the said abutting units on the clamping jaws.

11. The wrench with anti-penetration effect as claimed in claim 3, wherein the wrench is a tubing wrench and has one said abutting unit disposed on each engaging portion.

12. The wrench with anti-penetration effect as claimed in claim 11, wherein the said abutting units are formed on the top surface of the at least one wrench head respectively at the said engaging portions by a large punch head moved toward the at least one wrench head from the top surface to the bottom surface of the at least one wrench head to punch the top surface of the at least one wrench head deforming to form the said abutting units on the top surface of the at least one wrench head.

13. The wrench with anti-penetration effect as claimed in claim 2, wherein the said abutting unit is formed on the top surface of the at least one wrench head at the inclined angle of a corresponding said engaging portion by a small punch head moved toward the at least one wrench head from the top surface to the bottom surface of the at least one wrench head to punch the top surface of the at least one wrench head deforming to form the said abutting unit.

14. The wrench with anti-penetration effect as claimed in claim 2, wherein the said abutting units are formed on the top surface of the at least one wrench head respectively at the inclined angles of two corresponding said engaging portions by a large punch head moved toward the at least one wrench head from the bottom surface to the top surface of the at least one wrench head to punch the top surface of the at least one wrench head deforming to form the said abutting units on the clamping jaws.

15. The wrench with anti-penetration effect as claimed in claim 2, wherein each one of the two clamping jaws has two said engaging portions formed on the inner side of the clamping head at a spaced interval, and the at least one wrench head has one said abutting unit formed on one of the two said engaging portions of each one of the two clamping jaws adjacent to the mouth.

16. The wrench with anti-penetration effect as claimed in claim 15, wherein the curved portion is formed between two of the said engaging portions of the two clamping jaws without forming the said abutting units.

17. The wrench with anti-penetration effect as claimed in claim 2, wherein each one of the two clamping jaws has three said engaging portions formed on the inner side of the clamping head at spaced intervals, and the at least one wrench head has two said abutting units formed on one of the three said engaging portions of each one of the two clamping jaws adjacent to the mouth and one of the three said engaging portions of each one of the two clamping jaws that is positioned away from the mouth.

18. The wrench with anti-penetration effect as claimed in claim 17, wherein the curved portion is formed between two of the said engaging portions of the two clamping jaws that are positioned away from the mouth.

19. The wrench with anti-penetration effect as claimed in claim 2, wherein the wrench is a tubing wrench and has one said abutting unit disposed on each engaging portion.

20. The wrench with anti-penetration effect as claimed in claim 19, wherein the said abutting units are formed on the top surface of the at least one wrench head respectively at the said engaging portions by a large punch head moved toward the at least one wrench head from the top surface to the bottom surface of the at least one wrench head to punch the top surface of the at least one wrench head deforming to form the said abutting units on the top surface of the at least one wrench head.

21. The wrench with anti-penetration effect as claimed in claim 1, wherein the wrench is formed by multiple stacking and riveting pieces, and an inner side of the uppermost piece has a shape different from those of the other pieces to form the at least one abutting unit on the at least one wrench head.

22. The wrench with anti-penetration effect as claimed in claim 1, wherein the at least one wrench head is open-ended and has two clamping jaws connected and arranged facing each other, each one of the two clamping jaws having an end portion, and the two end portions disposed apart from each other; and a mouth formed between the two end portions of the two clamping jaws;

at least two of the said engaging portions are formed on an inner side of each one of the two clamping jaws; and the wrench has one said abutting unit disposed between the at least two of the said engaging portions of each one of the two clamping jaws.

23. The wrench with anti-penetration effect as claimed in claim 22, wherein the said abutting unit is formed on the top surface of the at least one wrench head between the at least two of the said engaging portions of each one of the two clamping jaws by a small punch head moved toward the at least one wrench head from the top surface to the bottom surface of the at least one wrench head to punch the top surface of the at least one wrench head deforming to form the said abutting unit.

24. The wrench with anti-penetration effect as claimed in claim 1, wherein the at least one wrench head has multiple said engaging portions formed on the inner side of the at least one wrench head at spaced intervals, and the said abutting unit is disposed on at least one of the multiple said engaging portions.

25. The wrench with anti-penetration effect as claimed in claim 24, wherein the said abutting unit is formed on the top surface of the at least one wrench head and aligns with the corresponding said engaging portion by a small punch head moved toward the at least one wrench head from the top surface to the bottom surface of the at least one wrench head to punch the top surface of the at least one wrench head deforming to form the said abutting unit.

26. The wrench with anti-penetration effect as claimed in claim 25, wherein the wrench has twelve said engaging portions formed on the inner side of the at least one wrench head at spaced intervals.

27. The wrench with anti-penetration effect as claimed in claim 24, wherein the said abutting unit is formed on the top surface of the at least one wrench head by a large punch head moved toward the at least one wrench head from the top surface to the bottom surface of the at least one wrench head to punch the top surface of the at least one wrench head deforming to form the said abutting unit.

28. The wrench with anti-penetration effect as claimed in claim 27, wherein the wrench has twelve said engaging portions formed on the inner side of the at least one wrench head at spaced intervals.

29. The wrench with anti-penetration effect as claimed in claim 24, wherein the said abutting unit is formed on the top surface of the at least one wrench head at the inclined angle of the corresponding said engaging portion by a large punch head moved toward the at least one wrench head from the bottom surface to the top surface of the at least one wrench head to punch the top surface of the at least one wrench head deforming to form the said abutting unit.

30. The wrench with anti-penetration effect as claimed in claim 29, wherein the wrench has twelve said engaging portions formed on the inner side of the at least one wrench head at spaced intervals.

31. The wrench with anti-penetration effect as claimed in claim 24, wherein the wrench has twelve said engaging portions formed on the inner side of the at least one wrench head at spaced intervals.

* * * * *